United States Patent
Li et al.

(10) Patent No.: US 12,322,751 B2
(45) Date of Patent: Jun. 3, 2025

(54) ALL SOLID STATE BATTERY

(71) Applicant: TOYOTA JIDOSHA KABUSHIKI KAISHA, Toyota (JP)

(72) Inventors: Ximeng Li, Susono (JP); Masumi Sato, Toyota (JP); Sakina Kaneko, Susono (JP); Tomoya Matsunaga, Susono (JP); So Yubuchi, Susono (JP); Mitsutoshi Otaki, Susono (JP); Hideaki Nishimura, Sunto-gun Shizuoka-ken (JP); Satoshi Wakasugi, Susono (JP); Shohei Kawashima, Susono (JP); Jun Yoshida, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 507 days.

(21) Appl. No.: 17/725,153

(22) Filed: Apr. 20, 2022

(65) Prior Publication Data
US 2022/0344706 A1    Oct. 27, 2022

(30) Foreign Application Priority Data

Apr. 27, 2021    (JP) .................................. 2021-074699

(51) Int. Cl.
*H01M 10/0562*    (2010.01)
*H01M 10/0525*    (2010.01)
(Continued)

(52) U.S. Cl.
CPC ... *H01M 10/0562* (2013.01); *H01M 10/0525* (2013.01); *H01M 50/446* (2021.01);
(Continued)

(58) Field of Classification Search
CPC ......... H01M 10/0562; H01M 10/0525; H01M 50/446; H01M 50/474; H01M 50/586; H01M 2300/0068
(Continued)

(56) References Cited

U.S. PATENT DOCUMENTS

2002/0114993 A1*  8/2002  Miyaki ............. H01M 10/0525
                                                                                429/246
2017/0104245 A1*  4/2017  Kodama ............... H01M 4/622
(Continued)

FOREIGN PATENT DOCUMENTS

JP    2014035818 A  *  2/2014
JP    2020-184407 A    11/2020

OTHER PUBLICATIONS

Notice of Allowance dated Feb. 11, 2025, issued to U.S. Appl. No. 17/724,059.
(Continued)

*Primary Examiner* — Nicholas A Smith
*Assistant Examiner* — Kevin Nguyen
(74) *Attorney, Agent, or Firm* — Dinsmore & Shohl LLP (57) ABSTRACT

A main object of the present disclosure is to provide an all solid state battery in which occurrence of short circuit is inhibited. The present disclosure achieves the object by providing an all solid state battery comprising an anode including at least an anode current collector, a cathode, and a solid electrolyte layer arranged between the anode and the cathode; wherein a protective layer containing a Mg-containing particle that contains at least Mg, and also containing a polymer, is arranged between the anode current collector and the solid electrolyte layer; the solid electrolyte layer contains a solid electrolyte in a granular shape; and when X designates an average particle size $D_{50}$ of the solid electro-
(Continued)

lyte and Y designates an average thickness of the solid electrolyte layer, X/Y is 0.0125 or more and 0.02 or less.

4 Claims, 3 Drawing Sheets

(51) Int. Cl.
  *H01M 50/446*  (2021.01)
  *H01M 50/474*  (2021.01)
  *H01M 50/586*  (2021.01)

(52) U.S. Cl.
  CPC ....... *H01M 50/474* (2021.01); *H01M 50/586* (2021.01); *H01M 2300/0068* (2013.01)

(58) Field of Classification Search
  USPC ........................................................ 429/251
  See application file for complete search history.

(56) References Cited

U.S. PATENT DOCUMENTS

2020/0343580 A1* 10/2020 Yushin ................ H01M 10/617
2020/0343582 A1  10/2020 Li et al.

OTHER PUBLICATIONS

Notice of Allowance dated Apr. 9, 2025, issued to U.S. Appl. No. 17/724,059.

* cited by examiner

FIG. 5B

ALL SOLID STATE BATTERY

CROSS-REFERENCE TO RELATED APPLICATIONS

This application is based upon and claims the benefit of priority of the prior Japanese Patent Application No. 2021-074699 filed Apr. 27, 2021, the entire contents of which are incorporated herein by reference.

TECHNICAL FIELD

The present disclosure relates to an all solid state battery.

BACKGROUND ART

An all solid state battery is a battery including a solid electrolyte layer between a cathode and an anode, and one of the advantages thereof is that the simplification of a safety device may be more easily achieved compared to a liquid-based battery including a liquid electrolyte containing a flammable organic solvent.

For example, Patent Literature 1 discloses an all solid state battery comprising, between an anode active material layer and a solid electrolyte layer, a protective layer that includes a composite metal oxide represented by Li-M-O, provided that M is at least one kind of metal elements selected from the group consisting of Mg, Au, Al and Sn.

CITATION LIST

Patent Literature

Patent Literature 1: Japanese Patent Application Laid-Open (JP-A) No. 2020-184407

Summary of Disclosure

Technical Problem

From the viewpoint of improving safety of an all solid state battery, occurrence of short circuit is inhibited. The present disclosure has been made in view of the above circumstances and a main object thereof is to provide an all solid state battery in which occurrence of short circuit is inhibited.

Solution to Problem

In order to achieves the object, the present disclosure provides an all solid state battery comprising an anode including at least an anode current collector, a cathode, and a solid electrolyte layer arranged between the anode and the cathode; wherein a protective layer containing a Mg-containing particle that contains at least Mg, and also containing a polymer, is arranged between the anode current collector and the solid electrolyte layer; the solid electrolyte layer contains a solid electrolyte in a granular shape; and when X designates an average particle size $D_{50}$ of the solid electrolyte and Y designates an average thickness of the solid electrolyte layer, X/Y is 0.0125 or more and 0.02 or less.

According to the present disclosure, a protective layer containing a Mg-containing particle and a polymer is arranged between the anode current collector and the solid electrolyte layer, as well as the average particle size of the solid electrolyte with respect to the average thickness of the solid electrolyte layer is in the specified range, and thus the occurrence of short circuit may be inhibited in the all solid state battery.

Effects of Disclosure

The present disclosure exhibits an effect of providing an all solid state battery in which occurrence of short circuit is inhibited.

DESCRIPTION OF EMBODIMENTS

The all solid state battery in the present disclosure will be hereinafter explained in details.

Figure 1:
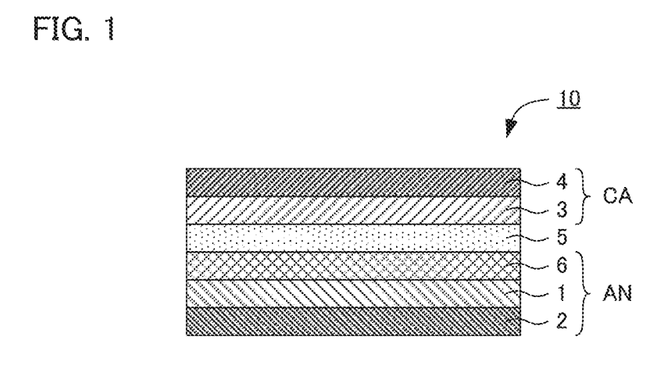
FIG. 1 is a schematic cross-sectional view illustrating an example of the all solid state battery in the present disclosure.

FIG. 1 is a schematic cross-sectional view illustrating an example of the all solid state battery in the present disclosure. All solid state battery 10 illustrated in FIG. 1 includes anode AN including anode active material later 1 and anode current collector 2, cathode CA including cathode active material layer 3 and cathode current collector 4, and solid electrolyte layer 5 arranged between the anode AN and the cathode CA. Further, in FIG. 1, between the anode active material layer 1 and the solid electrolyte layer 5, protective layer 6 that includes a Mg-containing particle containing at least Mg, and also includes a polymer, is arranged. Also, the solid electrolyte layer 5 contains a solid electrolyte in a granular shape, and the average particle size of the solid electrolyte with respect to the average thickness of the solid electrolyte layer is in the specified range. Incidentally, as shown in FIG. 1, the protective layer 6 may be regarded as a constituent element of the anode AN.

Figure 2:
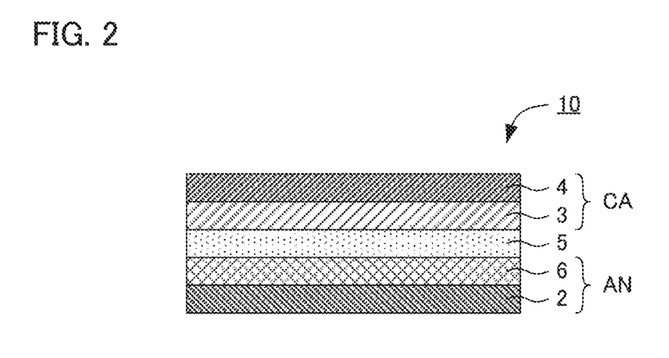
FIG. 2 is a schematic cross-sectional view illustrating an additional example of the all solid state battery in the present disclosure.

FIG. 2 is a schematic cross-sectional view illustrating an additional example of the all solid state battery in the present disclosure. As shown in FIG. 2, all solid state battery 10 may not include an anode active material layer, and anode current collector 2 and protective layer 6 may directly contact with each other. Also, when the all solid state battery shown in FIG. 2 is charged and lithium is deposited between the anode current collector 2 and the protective layer 6, the anode active material layer 1 (deposited lithium layer) shown in FIG. 1 is obtained. In other words, the all solid state battery in the present disclosure may be a battery utilizing deposition—dissolution reactions of a metal lithium.

According to the present disclosure, a protective layer containing a Mg-containing particle and a polymer is arranged between the anode current collector and the solid electrolyte layer, as well as the average particle size of the solid electrolyte with respect to the average thickness of the solid electrolyte layer is in the specified range, and thus the occurrence of short circuit may be inhibited in the all solid state battery.

In Patent Literature 1, in an all solid state battery utilizing deposition—dissolution reactions of a metal lithium as an anode reaction, a protective layer containing a composite metal oxide Li-M-O is arranged between the anode active material layer and the solid electrolyte layer, so as to protect from deterioration of the solid electrolyte due to the metal lithium and to suppress an interface resistance between the anode active material layer and the solid electrolyte layer. Also, in Patent Literature 1, vapor-deposition of the metal element M onto the anode current collector is carried out to charge, and bring into a reaction with Li, so as to form a protective layer containing the composite metal oxide.

Here, in the all solid state battery utilizing the deposition—dissolution reactions of a metal lithium as an anode reaction, the metal included in the protective layer also expands and contracts due to intercalation and desorption of Li. For this reason, the protective layer as in Patent Literature 1 has a risk of generation of a crack. When a crack is generated in the protective layer, there is a risk that short circuit may proceed from the crack. In contrast, the protective layer in the present disclosure contains a polymer, and thus the crack of the protective layer can be inhibited.

The cathode active material also expands and contracts due to charge and discharge. The solid electrolyte layer may not tolerate the stress and may crack, and there is a risk that short circuit may occur in that case. In contrast, the inventors of the present disclosure have found out that the resistance to crack of the solid electrolyte layer may improve and the short circuit of the all solid state battery may be inhibited when the average particle size of the solid electrolyte is adjusted and the average particle size of the solid electrolyte with respect to the average thickness of the solid electrolyte layer is in the specified range. It is presumed that the number of grain boundary that would become the origin of crack is reduced in the above conditions.

Here, so-called LiS battery using Li as the anode active material and S as the cathode active material has been known as a battery with excellent theoretical capacity. Meanwhile, in a sulfur cathode, uneven reaction easily occurs due to high insulation of sulfur. Also, the expansion and contraction amount of the sulfur cathode is large when the battery is charged and discharged. For these reasons, stress is easily applied to the solid electrolyte layer in the LiS battery. On the other hand, since the resistance to crack of the solid electrolyte can be improved in the present disclosure, the present disclosure may be suitably applied to batteries, to which stress is easily applied to the solid electrolyte layer, such as the LiS battery.

1. Protective Layer

The protective layer in the present disclosure is a layer arranged between the later described anode current collector and solid electrolyte layer, and contains a Mg-containing particle containing at least Mg, and also contains a polymer.

The Mg-containing particle contains at least Mg. The Mg-containing particle may be a particle of a simple substance of Mg, and may be a particle containing Mg and an element other than Mg. Examples of the element other than Mg may include Li and a metal (including half metal) other than Li. Also, an additional example of the element other than Mg may be non-metal such as O.

The Mg-containing particle may be an alloy particle containing Mg and a metal other than Mg. In some embodiments, the alloy particle is an alloy containing Mg as a main component. Examples of a metal M other than Mg in the alloy particle may include Li, Au, Al and Ni. The alloy particle may contain just one kind of the metal M, and may contain two kinds or more of the metal M. Also, the Mg-containing particle may or may not contain Li. In the former case, the alloy particle may include an alloy of β single phase of Li and Mg.

The Mg-containing particle may be an oxide particle containing Mg and O. Examples of the oxide particle may include an oxide of a simple substance of Mg, and a composite metal oxide represented by Mg-M'-O, provided that M' is at least one of Li, Au, Al and Ni. In some embodiments, the oxide particle contains at least Li as M'. M' may or may not contain a metal other than Li. In the former case, M' may be one kind of metal other than Li, and may be two or more kinds. Meanwhile, the Mg-containing particle may not contain O.

The Mg-containing particle may be a primary particle, and may be a secondary particle which is aggregation of the primary particles. Also, in some embodiments, the average particle size $D_{50}$ of the Mg-containing particle is small. When the average particle size is small, the dispersibility of the Mg-containing particle in the protective layer improves, and reaction point with Li increases; thus, it is effective to inhibit short circuit. The average particle size ($D_{50}$) of the Mg-containing particle is, for example, 500 nm or more, and may be 800 nm or more. Meanwhile, the average particle size ($D_{50}$) of the Mg-containing particle is, for example, 20 μm or less, may be 10 μm or less, and may be 5 μm or less.

The proportion of the Mg-containing particle in the protective layer is, for example, 50 weight % or more, may be 60 weight % or more, and may be 80 weight % or more. Meanwhile, the proportion of the Mg-containing particle is, for example, 99 weight % or less, and may be 90 weight % or less. Also, the Mg-containing particle expands and contracts when Li is intercalated and desorbed. In this point, the Mg-containing particle may be regarded as an active material. In some embodiments, the protective layer contains just the Mg-containing particle as an active material, but may contain an additional active material particle. The proportion of the Mg-containing particle with respect to all the active materials included in the protective layer is, for example, 50 weight % or more, may be 70 weight % or more, and may be 90 weight % or more.

Examples of the polymer (binder) may include a fluorine-based binder and a rubber-based binder. Examples of the fluorine-based binder may include polyvinylidene fluoride (PVDF) and polytetra fluoroethylene (PTFE). Also, examples of the rubber-based binder may include butadiene rubber (BR), acrylate butadiene rubber (ABR), and styrene butadiene rubber (SBR).

The proportion of the polymer in the protective layer is not particularly limited, but for example, it is 10 weight % or less, may be 5 weight % or less, may be 3 weight % or less, and may be 1 weight % or less. Meanwhile, the proportion of the polymer is, for example, 0.1 weight % or more.

The thickness of the protective layer is not particularly limited, and for example, it is 5 μm or more, and may be 15 μm or more. Meanwhile, the thickness of the protective layer is, for example, 100 μm or less, may be 50 μm or less, and may be 30 μm or less. Examples of the method for forming the protective layer may include a method of pasting and drying a mixture containing the Mg-containing particle, a polymer and a dispersion medium.

2. Solid Electrolyte Layer

The solid electrolyte layer in the present disclosure is a layer arranged between the later described anode and the cathode, and contains at least a solid electrolyte in a granular shape. Also, in the solid electrolyte layer of the present disclosure, the value X of the average particle size $D_{50}$ of the solid electrolyte with respect to the average thickness Y of the solid electrolyte layer is in the specified range. Also, the solid electrolyte layer may contain a binder as required.

The value X/Y, which is the value X of the average particle size $D_{50}$ of the solid electrolyte with respect to the average thickness Y of the solid electrolyte layer, is usually 0.0125 or more, may be 0.013 or more, may be 0.014 or more, and may be 0.015 or more. Meanwhile, X/Y is usually, 0.02 or less, may be 0.018 or less, and may be 0.016 or less. If X/Y is too small, the number of grain boundary that would be the origin of crack may increase, and there is a risk that the solid electrolyte layer easily cracks. Meanwhile, if X/Y is too large, the number of voids with respect to the thickness of the solid electrolyte layer increases too much. In that case, the voids tend to continue from the edge to edge of the solid electrolyte layer, and there is a risk that the solid electrolyte layer easily cracks.

The average particle size $D_{50}$ of the solid electrolyte is not particularly limited as long as the X/Y is satisfied. The average particle size of the solid electrolyte is, for example, 0.1 μm or more and 2 μm or less. The average particle size may be in the desired numerical value by preparing solid electrolytes in different average particle sizes, and mixing them in an arbitrary ratio.

The thickness of the solid electrolyte layer is not particularly limited as long as the X/Y is satisfied, but in some embodiments is thin. The reason therefor is to improve the energy density of the battery. The thickness of the solid electrolyte layer is, for example, 0.1 μm or more and 1000 μm or less.

Examples of the solid electrolyte may include an inorganic solid electrolyte such as a halide solid electrolyte, a sulfide solid electrolyte, an oxide solid electrolyte, and a nitride solid electrolyte. Among these, in some embodiments, a sulfide solid electrolyte is use.

In some embodiments, the sulfide solid electrolyte contains, for example, a Li element, an X element (X is at least one kind of P, As, Sb, Si, Ge, Sn, B, Al, Ga, and In), and a S element. Also, the sulfide solid electrolyte may further contain at least one of an O element and a halogen element. Examples of the shape of the solid electrolyte may include a granular shape.

Examples of the sulfide solid electrolyte may include $Li_2S$—$P_2S_5$, $Li_2S$—$P_2S_5$—LiI, $Li_2S$—$P_2S_5$—$GeS_2$, $Li_2S$—$P_2S_5$—$Li_2O$, $Li_2S$—$P_2S_5$—$Li_2O$—LiI, $Li_2S$—$P_2S_5$—LiI—LiBr, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (provided that m, n is a positive number and Z is one of Ge, Zn and Ga), $Li_2S$—$GeS_2$, $Li_2S$—$SiS_2$—$Li_3PO_4$, $Li_2S$—$SiS_2$-$Li_xMO_y$ (provided that x, y is a positive number and M is one of P, Si, Ge, B, Al, Ga and In).

3. Anode

The anode in the present disclosure includes at least an anode current collector. As described above, the anode may or may not include an anode active material layer.

In some embodiments, when the anode includes an anode active material layer, the anode active material layer contains at least one of a simple substance of Li and a Li alloy as an anode active material. Incidentally, in the present disclosure, a simple substance of Li and a Li alloy may be referred to as a Li-based active material in general. When the anode active material layer contains the Li-based active material, the Mg-containing particle in the protective layer may or may not contain Li.

For example, in an all solid state battery produced by using a Li foil or a Li alloy foil as the anode active material, and using a particle of simple substance of Mg as the Mg-containing particle, the simple substance of Mg is presumed to be alloyed with Li at the time of initial discharge. Meanwhile, in an all solid state battery produced by not arranging an anode active material layer, but using a particle of simple substance of Mg as the Mg-containing particle, and using a cathode active material containing Li, the simple substance of Mg is presumed to be alloyed with Li at the time of initial charge.

The anode active material layer may contain just one of a simple substance of Li and a Li alloy as the Li-based active material, and may contain the both of a simple substance of Li and a Li alloy.

In some embodiments, the Li alloy is an alloy containing a Li element as a main component. Examples of the Li alloy may include Li—Au, Li—Mg, Li—Sn, Li—Al, Li—B, Li—C, Li—Ca, Li—Ga, Li—Ge, Li—As, Li—Se, Li—Ru, Li—Rh, Li—Pd, Li—Ag, Li—Cd, Li—In, Li—Sb, Li—Ir, Li—Pt, Li—Hg, Li—Pb, Li—Bi, Li—Zn, Li—Tl, Li—Te and Li—At. The Li alloy may be just one kind, and may be two kinds or more.

Examples of the shape of the Li-based active material may include a foil shape and a granular shape. Also, the Li-based active material may be a deposited metal lithium. As described above, the protective layer contains a polymer (binder), but the anode active material layer may not contain a binder.

The thickness of the anode active material layer is not particularly limited; for example, it is 1 nm or more and 1000 μm or less, and may be 1 nm or more and 500 μm or less.

Also, examples of the material for the anode current collector may include Cu, Ni, In, Al and C. Examples of the shape of the anode current collector may include a foil shape, a mesh shape, and a porous shape.

4. Cathode

In some embodiments, the cathode in the present disclosure includes a cathode active material layer and a cathode current collector. The cathode active material layer in the present disclosure is a layer containing at least a cathode active material. Also, the cathode active material layer may contain at least one of a solid electrolyte, a conductive material, and a binder, as required.

The cathode active material is not particularly limited if it is an active material having higher reaction potential than that of the anode active material, and cathode active materials that can be used in an all solid state battery may be used. The cathode active material may or may not contain a lithium element.

Examples of the cathode active material containing a lithium element may include a metal lithium (Li), a lithium alloy, a lithium oxide and other lithium compounds.

In some embodiments, the Li alloy is an alloy containing a Li element as a main component. Examples of the Li alloy may include Li—Au, Li—Mg, Li—Sn, Li—Si, Li—Al, Li—Ge, Li—Sb, Li—B, Li—C, Li—Ca, Li—Ga, Li—As, Li—Se, Li—Ru, Li—Rh, Li—Pd, Li—Ag, Li—Cd, Li—Ir, Li—Pt, Li—Hg, Li—Pb, Li—Bi, Li—Zn, Li—Tl, Li—Te, Li—At and Li—In.

Examples of the lithium oxide may include a rock salt bed type active material such as $LiCoO_2$, $LiMnO_2$, $LiNiO_2$, $LiVO_2$, and $LiNi_{1/3}Co_{1/3}Mn_{1/3}O_2$; a spinel type active material such as $Li_4Ti_5O_{12}$, $LiMn_2O_4$, $LiMn_{1.5}Al_{0.5}O_4$, $LiMn_{1.5}Mg_{0.5}O_4$, $LiMn_{1.5}Co_{0.5}O_4$, $LiMn_{1.5}Fe_{0.5}O_4$ and $LiMn_{1.5}Zn_{0.5}O_4$; and an olivine type active material such as $LiFePO_4$, $LiMnPO_4$, $LiNiPO_4$ and $LiCoPO_4$.

Examples of other lithium compounds may include LiCoN, $Li_2SiO_3$, $Li_4SiO_4$, lithium sulfide ($Li_2S$) and lithium polysulfide ($Li_2S_x$; $2 \leq x \leq 8$).

Examples of the cathode active material not including a lithium element may include a transition metal oxide such as $V_2O_5$ and $MoO_3$; a S-based active material such as S and $TiS_2$; a Si-based active material such as Si and $SiO_2$; and a lithium storing intermetallic compound such as $Mg_2Sn$, $Mg_2Ge$, $Mg_2Sb$ and $Cu_3Sb$.

Also, a coating layer containing an ion conductive oxide may be formed on the surface of the cathode active material. The coating layer prevents the reaction of the cathode active material and the solid electrolyte, and thus the all solid state battery may have excellent output properties. Examples of the ion conductive oxide may include $LiNbO_3$, $Li_4Ti_5O_{12}$ and $Li_3PO_4$.

The proportion of the cathode active material in the cathode active material layer is, for example, 20 weight % or more, may be 30 weight % or more and may be 40 weight % or more. Meanwhile, the proportion of the cathode active material is, for example, 80 weight % or less, may be 70 weight % or less, and may be 60 weight % or less.

Examples of the conductive material may include a carbon material. Specific examples of the carbon material may include acetylene black, Ketjen black, VGCF and graphite. The solid electrolyte and the binder are as described above. Also, the thickness of the cathode active material layer is, for example, 0.1 μm or more and 1000 μm or less.

Also, examples of the material for the cathode current collector may include Al, Ni and C. Examples of the shape of the cathode current collector may include a foil shape, a mesh shape, and a porous shape.

5. Other Constitutions

The all solid state battery in the present disclosure may further include a restraining jig that applies a restraining pressure along with the thickness direction of the cathode, the solid electrolyte layer and the anode. As the restraining jig, known jigs may be used. The restraining pressure is, for example, 0.1 MPa or more and may be 1 MPa or more. Meanwhile, the restraining pressure is, for example, 50 MPa or less, may be 20 MPa or less, may be 15 MPa or less, and may be 10 MPa or less. The smaller the restraining pressure, the more the increase in size of the restraint jig can be suppressed. Meanwhile, the smaller the restraining pressure, the more easily short circuit occurs; however, arrangement of the protective layer in the present disclosure inhibits the occurrence of short circuit.

6. All Solid State Battery

The kind of the all solid state battery in the present disclosure is not particularly limited, but is typically a lithium ion battery. Also, the all solid state battery in the present disclosure may be a primary battery and may be a secondary battery. In some embodiments, the all solid state battery is a secondary battery among them. The reason therefor is to be repeatedly charged and discharged and useful as a car-mounted battery for example.

The all solid state battery in the present disclosure may be a single battery and may be a layered battery. The layered battery may be a monopolar layered battery (layered battery connected in parallel), and may be a bipolar layered battery (layered battery connected in series). Examples of the shape of the battery may include a coin shape, a laminate shape, a cylindrical shape and a square shape.

Incidentally, the present disclosure is not limited to the embodiments. The embodiments are exemplification, and any other variations are intended to be included in the technical scope of the present disclosure if they have substantially the same constitution as the technical idea described in the claims of the present disclosure and have similar operation and effect thereto.

EXAMPLES

Example 1

<Formation of Protective Layer>

To a container made of PP (polypropylene), heptane, a heptane solution containing 5 weight % or butadiene rubber, and Mg particle (simple substance of Mg, average particle size: 800 nm, from EM Japan Co., Ltd.) were added, and mixed for 30 seconds by an ultrasonic dispersion device (UH-50 from SMT Corporation). Next, the container was shaken for 30 minutes by a shaker (TTM-1 from SIBATA SCIENTIFIC TECHNOLOGY LTD.). Thereby, a mixture for a protective layer was prepared. The mixture was pasted on a substrate (Al foil) by a blade method using an applicator. Then, the pasted mixture was dried for 30 minutes on a hot plate at 100° C. Thereby, a protective layer with the substrate was obtained.

<Formation of Solid Electrolyte Layer>

A sulfide solid electrolyte having the average particle size $D_{50}$ of 0.5 μm and a sulfide solid electrolyte having $D_{50}$ of 2.0 μm were mixed so as to be 50:50 in the weight ratio to prepare a sulfide solid electrolyte having $D_{50}$ of 1.25 μm. As the sulfide solid electrolyte, $Li_2S$—$P_2S_5$-based solid electrolyte containing LiI—LiBr was used. Incidentally, the average particle size was obtained from a particle distribution measurement device. To a PP container, the sulfide solid electrolyte prepared, a heptane solution containing 5 weight % or ABR, and butyl butyrate were added, and mixed for 30 seconds by an ultrasonic dispersion device. Next, the substances in the container was shaken for 3 minutes by a shaker, and further mixed for 30 seconds by an ultrasonic dispersion device. Thereby, a mixture for a solid electrolyte layer was obtained. The mixture was pasted on a substrate (Al foil) by a blade method using an applicator so that the thickness of the solid electrolyte layer became 100 μm. Then, the pasted mixture was dried for 30 minutes on a hot plate at 150° C. Thereby, a transfer member including the substrate and the solid electrolyte layer was obtained.

A cathode active material (simple substance of sulfur), a sulfide ($P_2S_5$) and a binder (VGCF) were weighed so as to be S:$P_2S_5$:VGCF=52.3:19.2:28.3 in the weight ratio. These were mixed for 15 minutes with an agate mortar to obtain a raw material mixture. The raw material mixture was put into a container (45 mL, made of $ZrO_2$) of a planetary ball mill, $ZrO_2$ ball (φ=4 mm, 96 g) was further put thereinto, and the container was completely sealed. This container was installed to a planetary ball machine (P7 from Fritsch), and a cycle of: mechanical milling (revolution speed: 510 rpm) for 1 hour, stop for 15 minutes, mechanical milling in reverse revolution (revolution speed: 510 rpm) for 1 hour, stop for 15 minutes, was repeated for total 48 hours. Thereby, a cathode mixture was obtained.

Mesitylene and a mesitylene solution containing 5 weight % of SBR were put into a container, shaken for 3 minutes by a shaker (TTM-1 from SIBATA SCIENTIFIC TECHNOL- OGY LTD.), and mixed for 30 seconds by an ultrasonic dispersion device (UH-50 from SMT Corporation). The cathode mixture was put into the container, mixed for 30 seconds by the ultrasonic dispersion device, and shaken for 3 minutes by the shaker. This operation was repeated twice. After that, the product was pasted on a current collector (roughen Al foil) using an applicator with 240 μm pasting gap. After that, the product was dried for 30 minutes on a hot plate at 165° C. Thereby, a cathode including a cathode current collector and a cathode active material layer was obtained.

A Li foil that was used as an anode active material was placed on an anode current collector (Cu foil), and pressed at 100 MPa. Thereby, an anode including an anode current collector and an anode active material layer was obtained.

The cathode and the transfer member were layered so that the cathode active material layer and the solid electrolyte layer contacted with each other, pressed at 600 MPa, and the substrate (Al foil) was peeled off to obtain a layered body 1. Next, the anode and the protective layer with the substrate were layered so that the anode active material layer and the protective layer contacted with each other, pressed at 100 MPa, and the substrate was peeled off to obtain a layered body 2. Next, the layered body 1 and the layered body 2 were layered so that the solid electrolyte layer and the protective layer contacted with each other, and pressed at 100 MPa to obtain an electrode body. This electrode body was sealed in a laminate film, and restrained at 10 MPa by a restraining member. Thereby, an all solid state battery was produced.

Example 2

A sulfide solid electrolyte having the average particle size $D_{50}$ of 0.5 μm and a sulfide solid electrolyte having $D_{50}$ of 2.0 μm were mixed so as to be 30:70 in the weight ratio to prepare a sulfide solid electrolyte having $D_{50}$ of 1.63 μm. In the solid electrolyte layer, this sulfide solid electrolyte was used instead of the sulfide solid electrolyte having $D_{50}$ of 1.25 μm. An all solid state battery was produced in the same manner as in Example 1 except for the replacement.

Example 3

In the solid electrolyte layer, a sulfide solid electrolyte having $D_{50}$ of 2.0 μm was used instead of the sulfide solid electrolyte having $D_{50}$ of 1.25 μm. An all solid state battery was produced in the same manner as in Example 1 except for the replacement.

Comparative Example 1

In the solid electrolyte layer, a sulfide solid electrolyte having $D_{50}$ of 0.5 μm was used instead of the sulfide solid electrolyte having $D_{50}$ of 1.25 μm. Also, the protective layer was not formed. An all solid state battery was produced in the same manner as in Example 1 except for these.

Comparative Example 2

In the solid electrolyte layer, a sulfide solid electrolyte having $D_{50}$ of 0.5 μm was used instead of the sulfide solid electrolyte having $D_{50}$ of 1.25 μm. An all solid state battery was produced in the same manner as in Example 1 except for the replacement.

Comparative Example 3

In the solid electrolyte layer, a sulfide solid electrolyte having $D_{50}$ of 4 μm was used instead of the sulfide solid electrolyte having $D_{50}$ of 1.25 μm. An all solid state battery was produced in the same manner as in Example 1 except for the replacement.

[Evaluation]

<SEM Observation>

Figure 3A:
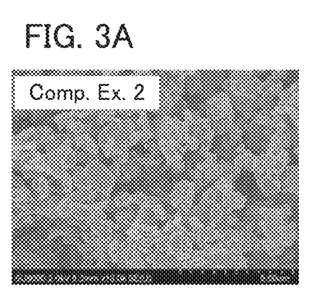
FIG. 3A is a SEM image of the solid electrolyte used in the solid electrolyte layer of Comparative Example 2.
Figure 3B:
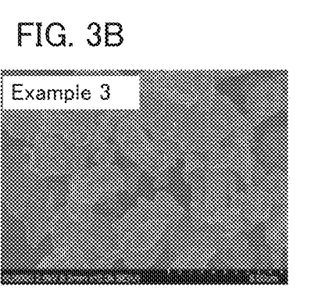
FIG. 3B is a SEM image of the solid electrolyte used in the solid electrolyte layer of Example 3.
Figure 3C:
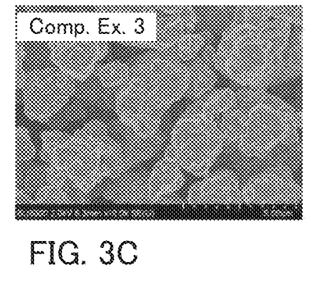
FIG. 3C is a SEM image of the solid electrolyte used in the solid electrolyte layer of Comparative Example 3.

Images of the sulfide solid electrolytes used in Example 3 and Comparative Examples 2 to 3 were obtained from a scanning electron microscope (SEM). The results are shown in FIGS. 3A to 3C. Also, cross-section processing was conducted to all solid state batteries produced in Examples 1 to 3 and Comparative Examples 1 to 3 before the charge and discharge test with an ion milling device, and the cross-section SEM images were obtained from the scanning electron microscope. The average thickness of the solid electrolyte layer was respectively calculated from the SEM images. X/Y was respectively calculated from the average thickness Y of the obtained solid electrolyte layer and the average particle size X of the sulfide solid electrolyte. The results are shown in Table 1. Also, the SEM images of the solid electrolyte layers in Comparative Example 2 and Example 3 are respectively shown in FIG. 4A and FIG. 4B.

<Charge and Discharge Test>

Figure 5A:
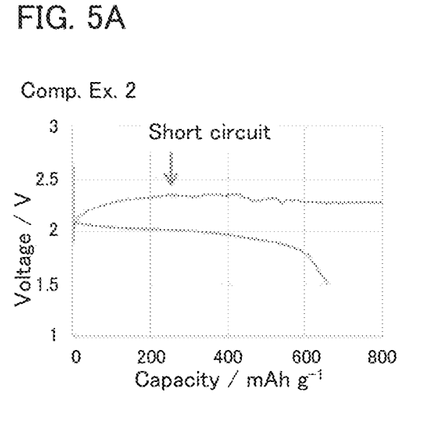
FIG. 5A is a charge and discharge curve of Comparative Example 2.
Figure 5B:
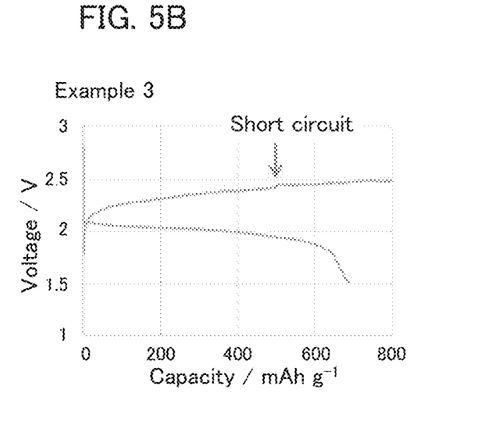
FIG. 5B is a charge and discharge curve of Example 3.

A charge and discharge test was respectively conducted to all solid state batteries produced in Examples 1, 3 and Comparative Examples 1 to 3 in the following manners. First, the battery was respectively constant current—constant voltage (CC-CV) discharged at 10 hour rate (0.1 C) until 1.5 V. After that, the battery was respectively charged at 10 hour rate (0.1 C) until 3.0 V. Since the inclination of the charge curves changes when short circuit occurs, the short circuit capacity was defined until that point, and the short circuit capacity was respectively measured. The results are shown in Table 1. Also, charge and discharge curves of Comparative Example 2 is shown in FIG. 5A, and charge and discharge curves in Example 3 is shown in FIG. 5B.

TABLE 1

|  | Protective layer | X/Y | Short circuit capacity (mAh/g) |
|---|---|---|---|
| Comp. Ex. 1 | None | 0.005 | 0 |
| Comp. Ex. 2 | Mg | 0.005 | 254 |
| Example 1 | Mg | 0.0125 | 495 |
| Example 2 | Mg | 0.0163 | 500 |
| Example 3 | Mg | 0.02 | 522 |
| Comp. Ex. 3 | Mg | 0.04 | 25 |

Figure 4A:
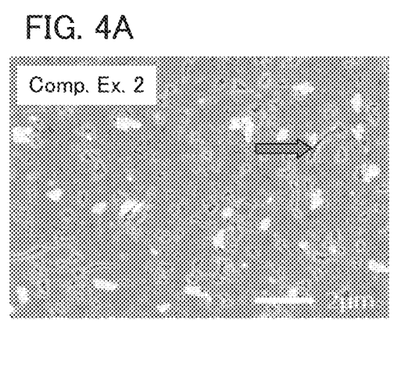
FIG. 4A is a SEM image of the solid electrolyte layer in Comparative Example 2.
Figure 4B:
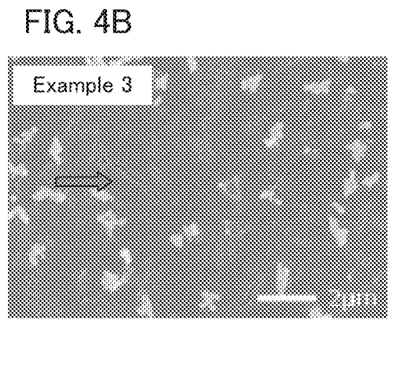
FIG. 4B is a SEM image of the solid electrolyte layer in Example 3.

As shown in FIGS. 3A to 3C, desired sulfide solid electrolyte was prepared by mixing. As shown in Table 1 and FIGS. 5A and 5B, short circuit capacity was larger in Examples 1 to 3 and Comparative Examples 2 to 3, in which the protective layer was included, compared with Comparative Example 1, in which the protective layer was not included. Also, short circuit capacity of Examples 1 to 3 was larger than that of Comparative Examples 1 to 3. As shown in FIGS. 4A and 4B, it was presumed that many cracks as shown in arrow marks in the drawings were generated even before the charge and discharge test, when the value of X/Y was too small. On the other hand, when the value of X/Y was too large as in Comparative Example 3, it is considered that the voids tend to continue from the edge to the edge of the solid electrolyte layer to easily cause the crack of the solid electrolyte.

REFERENCE SIGNS LIST

1 anode active material layer
2 anode current collector 3 cathode active material layer
4 cathode current collector
5 solid electrolyte layer
6 protective layer
10 all solid state battery

What is claimed is:

1. An all solid state battery comprising an anode including at least an anode current collector, a cathode, and a solid electrolyte layer arranged between the anode and the cathode; wherein
 a protective layer containing a Mg-containing particle that contains at least Mg, and also containing a polymer, is arranged between the anode current collector and the solid electrolyte layer;
 the solid electrolyte layer contains a solid electrolyte in a granular shape; and
 when X designates an average particle size $D_{50}$ of the solid electrolyte and Y designates an average thickness of the solid electrolyte layer, X/Y is 0.0125 or more and 0.02 or less.

2. The all solid state battery of claim 1, wherein X/Y is 0.0163 or more and 0.02 or less.

3. The all solid state battery of claim 1, wherein the Mg-containing particle is a simple substance of Mg.

4. The all solid state battery of claim 1, wherein the solid electrolyte is a sulfide solid electrolyte.

* * * * *